United States Patent
Treuner et al.

[11] 3,892,735
[45] July 1, 1975

[54] CYANODITHIOCARBAMIC ACID DERIVATIVES OF CEPHALOSPORINS

[75] Inventors: Uwe D. Treuner; Hermann Breuer, both of Regensburg, Germany

[73] Assignee: E. R. Squibb & Sons, Inc., Princeton, N.J.

[22] Filed: Mar. 5, 1973

[21] Appl. No.: 337,805

[52] U.S. Cl. .............................. 260/243 C; 424/246
[51] Int. Cl.² .................................... C07D 501/20
[58] Field of Search .............................. 260/243 C

[56] References Cited
UNITED STATES PATENTS
3,741,962  6/1973  Breuer ........................... 260/243 C

*Primary Examiner*—Nicholas S. Rizzo
*Attorney, Agent, or Firm*—Lawrence S. Levinson; Merle J. Smith

[57] ABSTRACT

New cyanodithiocarbamic acid derivatives of cephalosporins of the following general formula, and their salts

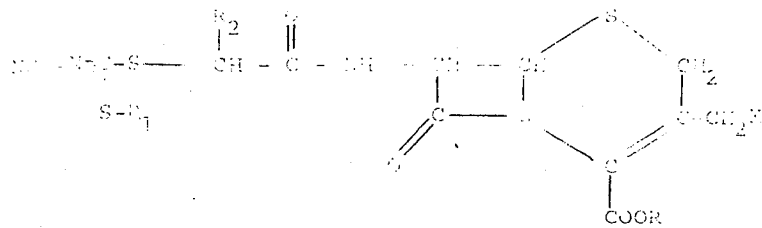

wherein R is hydrogen, lower alkyl, aralkyl, tri (lower alkyl)-silyl, a salt forming ion or the group

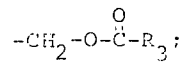

$R_1$ is lower alkyl or phenyl-lower alkyl; $R_2$ is hydrogen, lower alkyl, phenyl (which may be substituted) or certain heterocyclic groups; $R_3$ is lower alkyl, phenyl or phenyl-lower alkyl and X is hydrogen, hydroxy, lower alkanoyloxy, lower alkoxy, lower alkylthio, aroyloxy, aralkanoyloxy, the radical of a nitrogen base, or together X and R represent a bond linking carbon and oxygen in a lactone ring; are useful as antibacterial agents.

10 Claims, No Drawings

CYANODITHIOCARBAMIC ACID DERIVATIVES OF CEPHALOSPORINS

SUMMARY OF THE INVENTION

This invention relates to new antibacterial cyanodithiocarbamic acid derivatives of cephalosporins which have the formula

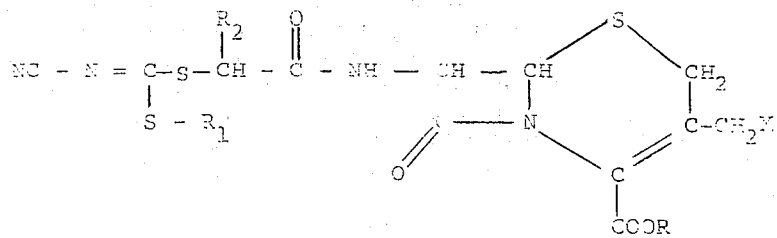

R represents hydrogen, lower alkyl, aralkyl, tri (lower alkyl) silyl, a salt forming ion or the group

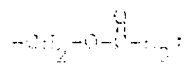

$R_1$ represents lower alkyl or phenyl-lower alkyl; $R_2$ represents hydrogen, lower alkyl, phenyl, which may be substituted with halogen, hydroxy, amino, lower alkyl or lower alkoxy, and certain heterocyclic groups; $R_3$ represents lower alkyl, phenyl or phenyl-lower alkyl; X is hydrogen, hydroxy, lower alkanoyloxy, lower alkoxy, lower alkylthio, aroyloxy, aralkanoyloxy or the radical of a nitrogen base. In addition X and R may represent a bond linking carbon and oxygen in a lactone ring.

The preferred members within each group are as follows: R is hydrogen, or a salt forming ion, especially an alkali metal like sodium or potassium; $R_1$ is lower alkyl, especially methyl or ethyl; $R_2$ is hydrogen or phenyl; and X is hydrogen, lower alkanoyloxy, especially acetoxy, lower alkoxy, especially methoxy, lower alkylthio, especially methylthio, or pyridinium.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to seven carbons in the chain, for example, methyl, ethyl, propyl, isopropyl, butyl, isobutyl, t-butyl, amyl or the like. The lower alkoxy and lower alkylthio groups contain the same radicals.

The phenyl group represented by $R_2$ may be simply substituted as defined above, with one to three groups ($R_4$) including halogen, hydroxy, amino, lower alkyl or lower alkoxy, preferably only one substituent.

The aralkyl groups include phenyl-lower alkyl and those similarly substituted on the phenyl ring as defined above.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are benzoyloxy and the aralkanoyloxy groups consisting of phenyl-lower alkanoyloxy radicals of the type described. X also represents the radical of an amine, e.g., a lower alkylamine like methylamine, ethylamine, dimethylamine, triethylamine, phenyl-lower alkylamine like dibenzylamine, and pyridine and quinoline quaternaries like pyridinium, 1-quinolinium, 1-picolinium, etc. X and R may also join together, as indicated above, to form a bond linking carbon and oxygen in a lactone ring.

The heterocyclic groups represented by $R_2$ are pyridyl, thienyl, furyl, oxazolyl, isoxazolyl and thiazolyl, as well as the simply substituted members, especially the halo, lower alkyl (particularly methyl and ethyl), lower alkoxy (particularly methoxy and ethoxy), phenyl and hydroxy-lower alkyl (particularly hydroxymethyl and hydroxyethyl) substituted members.

The salt forming ions may be metal ions, e.g., aluminum, alkali metal ions such as sodium or potassium alkaline earth metal ions such as calcium or magnesium, or an amine salt ion, of which a number are known for this purpose, for example, phenyllower alkylamines like dibenzylamine, N,N-dibenzylethylenediamine, lower alkylamine like methylamine, triethylamine, procaine or lower alkylpiperidines like N-ethylpiperidine, etc.

The compounds of formula I are produced by reacting a compound of the formula

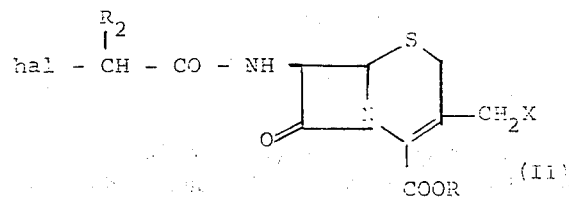

wherein X, R and $R_2$ have the meaning defined above, and hal is a halogen, preferably bromine, with a salt of a cyanodithiocarbamic acid monoester having the formula

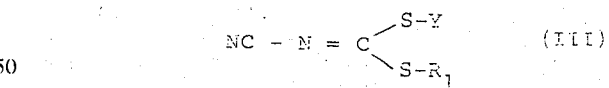

wherein $R_1$ has the meaning defined above and y is a metal ion, e.g., an alkali metal like potassium or sodium, especially the former.

This reaction is effected in an inert organic solvent like dimethylformamide at about ambient temperature or slightly higher, e.g., up to about 30°C. The product may then be separated by conventional procedures, e.g., filtration or extraction with a solvent, e.g., ethyl acetate, chromatography, etc.

Conversion of the product from the free acid form, e.g., R is hydrogen, may be accomplished by known procedures, e.g., by reaction with an alkali metal ester like potassium ethylhexanoate which gives the potassium salt.

The cyanodithiocarbamic acid monoester metal salts are novel compounds which may be produced by the reaction of a salt of cyanodithiocarbamic acid of the formula

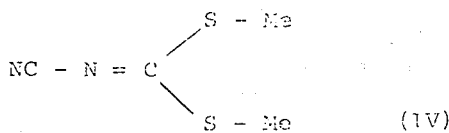

wherein Me represents a metal ion, e.g., an alkali metal like potassium, with a halide, $R_1$ — hal, wherein $R_1$ has the meaning defined above and hal is a halogen, preferably iodine.

This reaction may be effected merely by permitting the two reactants to interact in an inert solvent like dimethylformamide at about room temperature for a period of time. Stirring for about 30 minutes is illustrative of the conditions. The starting materials of formula IV are produced by the method of Hantzsch and Wolvekamp, Ann. 331, 265–297 (1904).

When R is the acyloxymethyl group

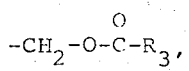

this group may be introduced onto the 7-aminocephalosporanic acid moiety of formula II either prior to or subsequent to the reaction with the compound of formula III by treatment with one or two moles of a halomethyl ester of the formula

wherein hal is halogen, preferably chlorine or bromine, in an inert organic solvent such as dimethylformamide, acetone, dioxane, benzene or the like at about ambient temperature or below.

The products of this invention form salts which are also part of the invention. Basic salts form with the acid moiety as discussed above when the symbol R is hydrogen.

It will be appreciated that certain of the compounds of this invention exist in various states of solvation as well as in different isomeric or optically active forms. The various forms as well as their mixtures are within the scope of this invention.

Further process details are provided in examples.

The compounds of this invention have a broad spectrum of antibacterial activity against both gram positive and gram negative organisms such as *Staphylococcus aureus, Salmonella schottmuelleri, Pseudomonas aeruginosa, proteus vulgaris, Escherichia coli* and *Streptococcus pyogenes*. They may be used an antibacterial agents in a prophylactic manner, e.g., in cleaning or as surface disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 100 mg./kg., daily, orally or parenterally, in single or two to four divided doses to treat infections of bacterial origin, e.g., 5.0 mg./kg. in mice.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practices.

They may also be used in cleaning or disinfecting compositions, e.g., for cleaning barns or dairy equipment, at a concentration of about 0.2 to 1% by weight of such compounds admixed with, suspended or dissolved in conventional inert dry or aqueous carriers for application by washing or spraying.

They are also useful as nutritional supplements in animal feeds.

The following examples are illustrative of the invention. All temperatures are on the centigrade scale. Additional variations may be produced in the same manner by appropriate substitution in the starting material.

EXAMPLE 1

7-[2-[[(Cyanoimino)(methylthio)methyl]thio]acetamido]-3-(hydroxymethyl)-8-oxo-5-thia-1-azabicyclo[4.2.0]oct-2-ene-2-carboxylic acid,3-acetate,potassium salt a. 17.8 g. (100 mM) of cyanodithiocarbamic acid, S,S-dipotassium salt [Ann. 331, 283 (1904)] are dissolved in 75 ml of dimethylformamide and 14.2 g. (100 mM) of methyl iodide are added dropwise with stirring. After stirring for 30 minutes, the undissolved material is filtered off. An equal volume of ether is added to the filtrate, whereupon the potassium iodide precipitates completely. Filtration and treatment of the filtrate with a large volume of ether yields 6.5 g. of the S-potassium salt of cyanodithiocarbamic acid monomethyl ester as a yellow powder, m. p. 205°.

b. 3.9 g. (10 mM) of 7-(bromoacetamido) cephalosporanic acid are dissolved in 20 ml. of absolute dimethylformamide and 1.55 g. (9 mM) of the product of part a is added at room temperature with stirring. Upon slight warming, the mixture becomes turbid and the reaction begins at once.

After 10 minutes, the reaction mixture is poured into 300 ml. of water and extracted with about 300 ml. of ethyl acetate. The ethyl acetate extract is washed with 3 × 50 ml. of water and dried over sodium sulfate. Concentration under vacuum yields 7-[2-[[(cyanoimino)(methylthio)methyl]thio] acetamido]-3-(hydroxymethyl)-8-oxo-5-thia-1-azabicyclo[4.2.0] oct-2-ene-2-carboxylic acid 3-acetate as a viscous syrup in 70% yield.

This is chromatographed in a column with silica gel-ethyl acetate to obtain a light yellow semi-solid product which is treated with potassium ethylhexanoate to obtain 7-[2-[[ (cyanoimino) (methylthio)methyl]thio-]acetamido]-3-(hydroxymethyl) -8-oxo-5-thia-1-azabicyclo[4.2.0]oct-2-ene-2-carboxylic acid, 3-acetate,potassium salt in 72% yield, m. p. 130°.

EXAMPLE 2

7-[2-[[(Cyanoimino)(ethylthio)methyl]thio]acetamido]-3-(hydroxymethyl)-8-oxo-5-thia-1-azabicyclo[4.2.0]oct-2-ene-2-carboxylic acid, 3-acetate, potassium salt By substituting 15.6 g. (100 mM) of ethyl iodide for the methyl iodide in the procedure of Example 1a, the S-potassium salt of cyanodithiocarbamic acid monoethyl ester is obtained. Then by using this product in the procedure of Example 1b 7-[2-[[(cyanoimino) (ethylthio)methyl]thio]acetamido-3-hydroxymethyl)-8-oxo-5-thia-1-azabicyclo[4.2.0]oct-2-ene-2-carboxylic acid, 3-acetate and its potassium salt are obtained.

EXAMPLE 3

7-[2-[[(Cyanoimino) (methylthio)methyl]thio]acetamido]-3-methyl-8-oxo-5-thia-1-azabicyclo[4.2.0]oct-2-ene-2-carboxylic acid, potassium salt.

By substituting 10 mM of 7-(bromoacetamido)-3-desacetoxycephalosporanic acid for the 7-(bromoacetamido) cephalosporanic acid in the procedure of Example 1b, 7-[2-[[(cyanoimino) (methylthio) methyl]thio]acetamido]-3-methyl-8-oxo-5-thia-1-azabicyclo]4.2.0] oct-2-ene-2-carboxylic acid and its potassium salt are obtained.

EXAMPLE 4

To obtain the triethylamine salt of the product of Example 1, an equivalent amount of triethylamine is added to an ethanol solution of the free acid obtained in part a and the reaction product is concentrated at reduced pressure to deposit the product.

The following additional products are obtained according to the procedure of Example 1 by substituting for the S-potassium salt of cyanodithiocarbamic acid monomethyl ester the corresponding ester in which $R_1$ is that listed in the table and additionally utilizing in part b the 7-(bromacetamido) cephalosporanic acid having the substituents R, $R_2$ and X listed in the table:

TABLE

| Example | R | $R_1$ | $R_2$ | X |
|---|---|---|---|---|
| 5 | H | $CH_3$ | $NH_2$—C$_6$H$_4$— | H |
| 6 | $CH_3$ | $CH_3$ | H | H |
| 7 | K | $C_2H_5$ | $C_6H_5$ | OH |
| 8 | H | $C_2H_5$ | H | pyridinium |
| 9 | —CH$_2$OC(O)—CH(CH$_3$)$_2$ | $CH_3$ | $C_6H_5$ | OCOCH$_3$ |
| 10 | —CH$_2$OC(O)—C$_6$H$_5$ | $CH_3$ | 4—ClC$_6$H$_4$— | OCOCH$_3$ |
| 11 | K | $CH_3$ | 3,4—(CH$_3$O)$_2$C$_6$H$_3$— | H |
| 12 | $C_2H_5$ | $CH_3$ | 3,4,5—(CH$_3$O)$_3$C$_6$H$_2$— | OCOCH$_3$ |
| 13 | H | —CH$_2$—C$_6$H$_5$ | 4—CH$_3$C$_6$H$_4$— | OCOCH$_3$ |
| 14 | lactone (+X) | $C_2H_5$ | 3,4—(Br)$_2$C$_6$H$_3$— | lactone (+R) |
| 15 | K | $CH_3$ | 2,4—(Cl)$_2$C$_6$H$_3$— | OCOCH$_3$ |
| 16 | K | $CH_3$ | $C_6H_5$-isoxazolyl-CH$_3$ | OCOCH$_3$ |
| 17 | $C_2H_5$ | —CH$_2$CH$_2$—C$_6$H$_5$ | $C_2H_5$ | OCOCH$_3$ |
| 18 | Na | $CH_3$ | $CH_3$ | OCOCH$_3$ |
| 19 | $C_2H_5$ | $CH_3$ | thienyl | OCOCH$_3$ |
| 20 | $C_6H_5CH_2$— | —CH$_2$—C$_6$H$_5$ | furyl | OOCH$_2$C$_6$H$_5$ |
| 21 | —CH$_2$O—C(O)—CH(CH$_3$)$_2$ | —CH$_2$—C$_6$H$_5$ | $C_6H_5$— | —OCOCH$_3$ |
| 22 | —Si(CH$_3$)$_3$ | Ch$_3$ | H | H |
| 23 | —N(C$_2$H$_5$)$_3$ | $CH_3$ | $C_6H_5$— | H |
| 24 | K | $C_2H_5$ | $C_3H_7$— | —SCH$_3$ |
| 25 | H | $CH_3$ | pyridyl | —OCH$_3$ |

TABLE – Continued

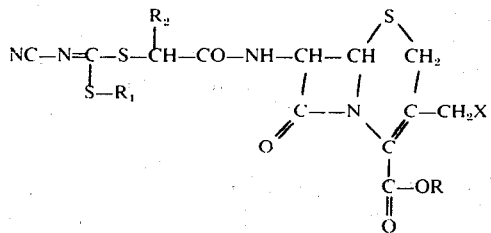

| Example | R | R₁ | R₂ | X |
|---------|---|-----|-----|---|
| 26 | $-CH_2OCC_6H_5$ (with =O) | $CH_3$ | $NH_2$–⟨phenyl⟩– | H |
| 27 | K | $CH_3$ | (isothiazole ring N–S) | H |
| 28 | K | $C_2H_5$ | H | $SC_2H_5$ |
| 29 | K | $CH_3$ | HO–⟨phenyl⟩– | H |

What is claimed is:

1. A compound of the formula

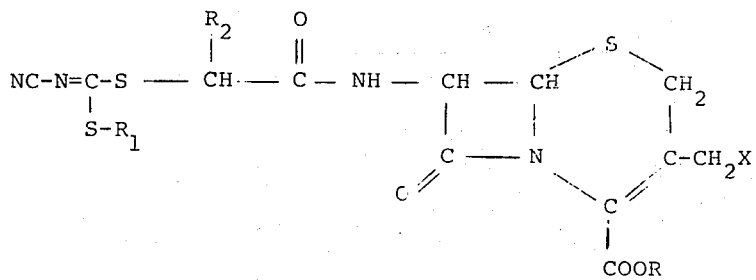

wherein R is hydrogen, tri(lower alkyl)silyl, $$-CH_2-O-\overset{O}{\underset{\|}{C}}-R_3,$$

alkali metal, alkaline earth metal or lower alkylamine; $R_1$ is lower alkyl or phenyl-lower alkyl; $R_2$ is hydrogen, lower alkyl, phenyl, thienyl, furyl or pyridyl; $R_3$ is lower alkyl, phenyl or phenyl-lower alkyl; and X is hydrogen, hydroxy, lower alkanoyloxy, lower alkoxy or lower alkylthio.

2. A compound of the formula

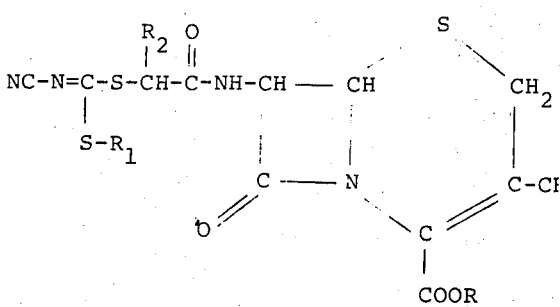

wherein R is hydrogen, lower alkyl, phenyl-lower alkyl, tri(lower alkyl)silyl;

$$-CH_2-O-\overset{O}{\underset{\|}{C}}-R_3$$

or a salt forming ion of the group consisting of alkali metal, alkaline earth metal, lower alkylamine, phenyl-lower alkylamine or lower alkylpiperidine; $R_1$ is lower alkyl or phenyl-lower alkyl; $R_2$ is hydrogen or lower alkyl; $R_3$ is lower alkyl, phenyl or phenyl-lower alkyl; and X is hydrogen, hydroxy or lower alkanoyloxy.

3. A compound as in claim 2 wherein R is hydrogen or one of said salt forming ions; $R_1$ is lower alkyl; $R_2$ is hydrogen; and X is hydrogen or lower alkanoyloxy.

4. A compound as in claim 2 wherein $R_1$ is lower alkyl and $R_2$ is hydrogen.

5. A compound as in claim 4 wherein R is hydrogen or alkali metal and X is hydrogen or acetoxy.

6. A compound as in claim 2 wherein R, $R_2$ and X each is hydrogen and $R_1$ is methyl.

7. Alkali metal salt of the compound of claim 6.

8. A compound as in claim 2 wherein R and $R_2$ each is hydrogen, $R_1$ is methyl and X is acetoxy.

9. Alkali metal salt of the compound of claim 8.

10. A compound as in claim 2 wherein R is potassium, $R_1$ is ethyl, $R_2$ is hdyrogen and X is acetoxy.

* * * * *